United States Patent [19]

Gharadjedaghi et al.

[11] Patent Number: 4,545,649
[45] Date of Patent: Oct. 8, 1985

[54] ELECTRO-OPTICAL DISPLAY DEVICE OF POINT MATRIX TYPE

[75] Inventors: Fereydoun Gharadjedaghi, Neuchâtel; Jean-Francois Guyenet, Montmollin, both of Switzerland

[73] Assignee: Asulab S.A. - ETA 72, Bienne, Switzerland

[21] Appl. No.: 343,452

[22] Filed: Jan. 28, 1982

[30] Foreign Application Priority Data

Feb. 9, 1981 [CH] Switzerland .................. 828/81

[51] Int. Cl.$^4$ ............................................. G02F 1/133
[52] U.S. Cl. .................................. 350/356; 350/333; 340/784
[58] Field of Search ................. 350/333, 356; 340/784

[56] References Cited

U.S. PATENT DOCUMENTS

| | | | |
|---|---|---|---|
| 3,975,085 | 8/1976 | Yamada et al. | 340/784 |
| 4,127,848 | 11/1978 | Shanks | 340/784 |
| 4,142,182 | 2/1979 | Kmetz | 350/333 X |
| 4,227,193 | 10/1980 | Shanks | 340/784 |
| 4,233,602 | 11/1980 | Hanmura | 340/752 |
| 4,449,125 | 5/1984 | Clerc et al. | 340/784 X |

Primary Examiner—John K. Corbin
Assistant Examiner—Lynn Vandenburgh Kent
Attorney, Agent, or Firm—Allegretti, Newitt, Witcoff & McAndrews, Ltd.

[57] ABSTRACT

The column electrodes of the display device are each formed by an alignment of conducting areas which are electrically connected to each other and which are spaced from each other, while disposed between two successive conducting areas of each electrode, in alignment with said conducting areas is a conducting area of an adjoining electrode. n+1 different reference signals are produced such that the effective value of the difference between two different signals is sufficient to generate an electro-optical effect. The first n signals of said signals are each applied to a line electrode. A signal selected from the above-mentioned n+1 signals is applied to each column electrode said selection being made in dependence on the value of a control signal.

5 Claims, 13 Drawing Figures

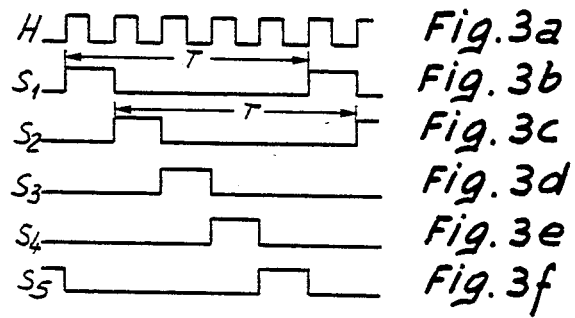
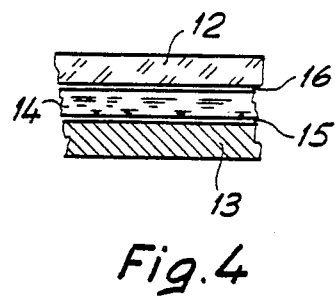
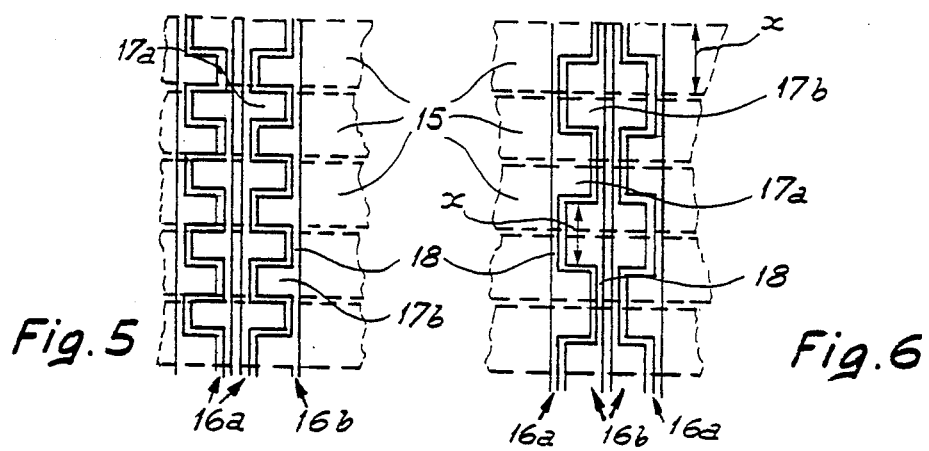
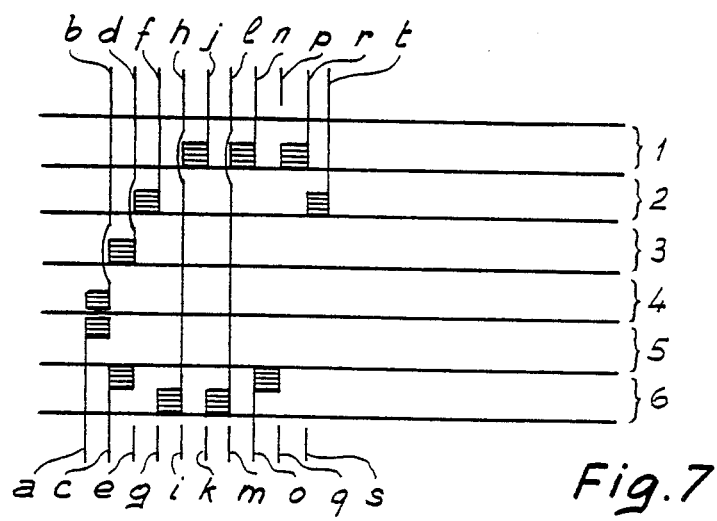

ELECTRO-OPTICAL DISPLAY DEVICE OF POINT MATRIX TYPE

FIELD OF THE INVENTION

The present invention concerns electro-optical display devices and more particularly display devices using a cell of point matrix type. The cell comprises a layer of a material which is capable of responding to the application of an electrical field by a modification in its optical behaviour. Such a material is preferably a mixture of liquid crystals, and the mixture may contain a dichroic compound. It would also be possible to use an electroluminescent material. The layer is disposed between two systems of electrodes. The electrodes of these systems are arranged so that the assembly of the points at which an electrode of a system is projected onto an electrode of the other system forms a matrix.

The invention can be applied in particular to timepieces using such a point matrix-type display device.

BACKGROUND OF THE INVENTION

In the present state of the art, point matrix-type cells using liquid crystals are generally controlled sequentially (multiplexing). Now, a sequential control mode of this kind can be applied only to cells making use of a threshold-type electro-optical phenomenon.

It is known that display cells comprising a liquid crystal, of the twisted nematic type, such as those described in U.S. Pat. No. 3.918.796, use a threshold-type electro-optical phenomenon. On the other hand, cells using a liquid crystal containing a dichroic compound, such as those described in U.S. Pat. Nos. 3.551.026 or 3.833.287, make use of an electro-optical phenomenon which does not have a clearly marked threshold. The result of this is that such cells, for control thereof, require a large number of output terminals, which makes their cost price prohibitive and which results in an excessive increase in their dimensions.

Further, even when it can be used, the sequential mode of controlling a liquid crystal display cell causes deterioration in the degree of contrast of the display, and also a reduction in the reading angle of the cell.

In order to overcome the above-indicated disadvantages, a display device has already been proposed (British Pat. No. 2.001.794), which comprises a point matrix cell and a control device including a circuit which is operative to produce n+1 different periodic signals, wherein n is the number of electrodes of a first system of the display cell. The signals must be such that the effective value (i.e. the root mean square) of the potential difference between any two of said signals is greater than or equal to the minimum electrical voltage required to produce an electro-optical effect in the sensitive material of the cell.

Each of the n first signals is applied to a respective electrode of the first system, and a signal selected from the n+1 signals described hereinbefore is applied to each of the electrodes of the second system which are associated with the columns of the matrix, the selection from n+1 signals being made in dependence on the information which is to be displayed by the cell.

Nonetheless, in this known display device, the matrix-type display cell is provided with electrodes which are structured in such a way that each column of points of the matrix is associated with a single electrode of the second system. The result of this is that the known cell can display only figures that can be represented by differentiation of a single point at most in each column of the cell. In consequence, the known display device cannot display symbols requiring differentiation of a number of points in each column, and in particularly cannot display alpha-numeric characters.

Also known (SID 1978 DIGEST, pages 92 and 93, an article entitled "Liquid crystal television display") is a point matrix-type display cell having a configuration of electrodes such that each column of points of the display matrix is associated with two electrodes of the second system. Nonetheless, this particular electrode configuration was proposed only for the purpose of reducing the degree of multiplexing in controlling the display cell.

The aim of the present invention is in particular to propose a point matrix-type display device capable of displaying figures such as alpha-numeric characters, which require differentiation of more than one point per column in the matrix, while making it possible to use a display cell which employs any electro-optical phenomenon.

In particular, an object of the present invention is to propose a point matrix-type display device which uses a display cell, the sensitive material of which is a liquid crystal comprising a dichroic compound.

Another object of the present invention is to provide a display device which gives an excellent level of contrast and a relatively large reading angle.

BRIEF SUMMARY OF THE INVENTION

The applicants have surprisingly found that these aims can be attained by using a point matrix-type display cell which is so designed that each column of the matrix is associated with a plurality of electrodes of the second system, and a control device of a type equivalent to that proposed by the above-mentioned British patent.

In a presently preferred embodiment each electrode of the second system comprises a series of elementary conducting areas which are electrically connected to each other and which are spaced from each other. At least two neighbouring electrodes of the second system are associated to one column of the matrix in the following manner: at least one area of one electrode is disposed in the space between two consecutive areas of the other electrode.

BRIEF DESCRIPTION OF THE DRAWINGS

The features and advantages of the invention will be better appreciated from the following description of a number of embodiments of the invention, with reference to the accompanying drawings in which:

FIG. 4 is a view in cross-section through a display cell which can be used in the system shown in FIG. 1, FIG. 5 is a diagrammatic plan view of part of the display cell shown in FIG. 4, illustrating an arrangement of the electrodes of the second system, in accordance with a first embodiment, FIG. 6 is a similar view to that shown in FIG. 5, illustrating another form of the arrangement of the electrodes of the second system, and FIG. 7 is a diagrammatic plan view of a display cell according to the invention, displaying the letter C.

DETAILED DESCRIPTION OF PREFERRED EMBODIMENTS

Figure 1:
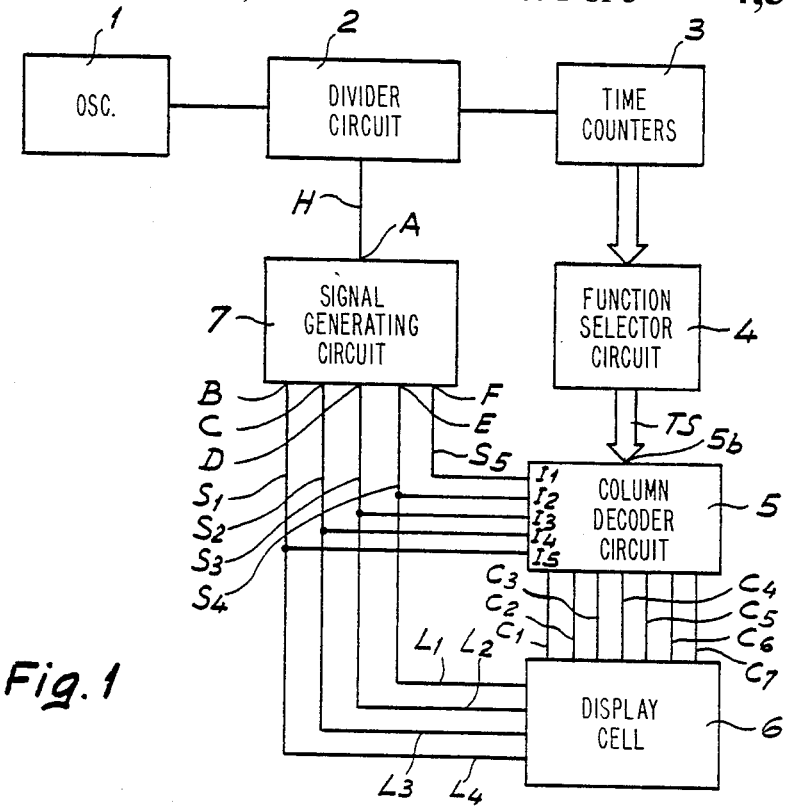
FIG. 1 is a synoptic diagrammatic view of an electronic system of a watch using a display device in accordance with one embodiment of the invention.

The system shown in FIG. 1 comprises a time base such as a quartz oscillator 1, a divider circuit 2 for dividing the high-frequency time base signal supplied by the circuit 1 and producing a low-frequency time base signal, time counters 3 which receive the low-frequency time base signal and which supply digital signals representing time information, and a function selector circuit 4 for selecting certain ones of said time information signals and applying said selected signals to the input of a column decoder circuit 5, the mode of operation of which will be described in detail hereinafter.

The system shown in FIG. 1 further comprises a display cell 6 having a matrix of points, which, for the sake of simplicity of the drawing, has only four line electrodes connected to the conductors L1 to L4 and seven column electrodes connected to the conductors C1 to C7.

For the purpose of controlling this cell, use is made of a signal generating circuit 7 having a clock input A which is connected to an output of an intermediate division stage of the divider circuit 2, that output producing a clock signal H. In the present case, the generator circuit 7 comprises $4+1=5$ outputs B, C, D, E and F. The circuit 7 is arranged to respond to the clock signal H which signals is applied to its input A, producing five reference signals S1 to S5. Each of the first four signals S1 to S4 is applied to a respective line electrode of the display device 6.

The column decoder 5 comprises five reference signals inputs I1 to I5 which each receive a respective reference signal S1 to S5. The column decoder further comprises time data inputs 5b receiving one or more species of time data TS which are selected by the user of the watch, by means of the function selector 4.

The column decoder 5 is arranged to apply to each of the column electrodes of the display device 6, a signal which is selected from the signals S1 to S5 in dependence on said time data TS received on the inputs 5b. The circuit 5 may comprise a pre-programmed read-only memory 100 (FIG. 2a), the inputs 100a of which constituting the input 5b of circuit 5 receive the time data-carrier signals TS which are presented in binary form, transmitted by the circuit 4. In the present case, the read-only memory 100 comprises 35 outputs 100b which are each directly connected to an input of a respective AND-gate 101 of a matrix of AND-gates. These AND-gates are connected by way of one of their inputs to the terminals I1 to I5 and by way of their output, by way of OR-gates 102, to the conductors C1 to C7, as shown in FIG. 2a.

In the embodiment illustrated in FIGS. 3b to 3f, the reference signals S1 to S5 comprise periodic series of rectangular pulses, the series of pulses being out-of-phase relative to each other by $2\pi/5$. The signals S1 to S5 are all of the same period T and are formed by rectangular pulses of a duration equal to T/5. Such an assembly of signals can be supplied by the circuit shown in FIG. 2b. This circuit comprises four D type flip-flops 8a to 8d, the clock inputs CL of which are connected to the input A of the circuit 7. The circuit shown in FIG. 2a further comprises five AND-gates 9b to 9f, the outputs of which are respectively connected to the outputs B to F of that circuit. The circuit of FIG. 2b comprises a sixth AND-gate 9g, the output of which is connected to the reset inputs R of the flip-flop 8a to 8d. Each of the AND-gates 9b to 9g comprises two inverter inputs connected to the outputs Q and $\overline{Q}$ of flip-flop 8a to 8d, in accordance with Table 1 below.

TABLE 1

| AND-gate | 1st input | 2nd input |
| --- | --- | --- |
| 9b | Q of 8d | Q of 8a |
| 9c | $\overline{Q}$ of 8a | Q of 8b |
| 9d | $\overline{Q}$ of 8b | Q of 8c |
| 9e | $\overline{Q}$ of 8c | Q of 8d |
| 9f | $\overline{Q}$ of 8a | $\overline{Q}$ of 8d |
| 9g | Q of 8a | $\overline{Q}$ of 8b |

In addition, the D inputs of the flip-flop 8b and 8d respectively are connected to the Q inputs of the flip-flops 8a and 8c respectively, the D input of the flip-flop 8a is connected to the $\overline{Q}$ output of the flip-flop 8d; and the D input of the flip-flop 8c is connected to the $\overline{Q}$ output of the flip-flop 8b by way of a circuit comprising two NOR-gates 10 and 11.

When the clock signal H shown in FIG. 3a is applied to the input A of the circuit 7 (see FIG. 1), the reference signals S1 to S5 respectively appear at the outputs B to F of the circuit 7.

In the embodiment shown in FIG. 4, the display cell 6 comprises a front transparent plate 12, a rear plate 13 and a layer 14 of liquid crystal which is interposed between the plates 12 and 13. The liquid crystal layer 14 contains a dichroic compound. A first system of electrodes in the form of parallel strips 15 of the same width is deposited on the internal face of the rear plate 13; on its internal face, the front plate 12 carries a second system of electrodes $16_a$ and $16_b$ which are parallel to each other and orthogonal to the electrodes 15 of the rear plate 13.

As can be seen from FIGS. 5 and 6 showing two preferred electrode configurations, each of the electrodes $16_a$ and $16_b$ of the second system comprises a series of conducting areas $17_a$ and $17_b$ of substantially square shape (this is the situation shown in FIG. 5) or of substantially rectangular shape (as shown in FIG. 6), with each of the areas $17_a$ and $17_b$ being connected to adjacent areas by isthmuses 18 that are sufficiently thin for the display effect that they are capable of producing to be invisible to the naked eye. In the drawing, the width of the isthmus 18 has been exaggerated, for enhanced clarity.

The areas $17_a$ of the same electrode $16_a$ are spaced from each other so that between two adjoining areas there is a space which is occupied by an area $17_b$ of an adjoining electrode $16_b$, The conducting areas $17_a$ and $17_b$ are distributed in accordance with a matrix of points, in which each column comprises two electrodes $16_a$ and $16_b$.

In the example shown in FIG. 5, two successive areas $17_a$ and $17_b$ of the same column are projected in their entirety onto a common conducting strip 15. In the example shown in FIG. 6, each area $17_a$ and $17_b$ of a column is projected half onto one strip 15 and half onto the adjoining strip 15. Moreover, in that example, each conducting area $17_a$ and $17_b$ is of a dimension "x", transversely with respect to the strips 15, that is substantially equal to the width of the strips 15.

FIG. 7 is a diagrammatic view of a point matrix-type display cell having the structure of the cell shown in FIG. 5 and comprising six line electrodes or electrodes of the first system, and twenty column electrodes, or electrodes of the second system. In FIG. 7, the line electrodes are numbered with arabic numerals from 1 to 6, while the column electrodes are each designated by a lower-case letter of the alphabet.

In the example shown in FIG. 7, the arrangement uses a signal generator which is similar to that designated by reference numeral 7 in FIG. 1 but which can produce seven different periodic signals S1 to S7, of which the first six signals S1 to S6 are each applied to a respective line electrode 1 to 6.

In order to display the letter C as shown in FIG. 7, it is sufficient for a suitable reference signal to be applied to each column electrode or second system electrode "a" to "t", in accordance with Table 2 below:

TABLE 2

| column electrode | Signal | column electrode | Signal |
|---|---|---|---|
| a | S5 | k | S7 |
| b | S4 | l | S6 |
| c | S6 | m | S7 |
| d | S3 | n | S1 |
| e | S7 | o | S6 |
| f | S2 | p | S7 |
| g | S7 | q | S7 |
| h | S6 | r | S1 |
| i | S7 | s | S7 |
| j | S1 | t | S2 |

The signals S1 to S7 are periodic series of rectangular pulses of a period T, with the pulse series being out-to-phase with respect to each other by $2\pi/7$, and with the duration of each of the rectangular pulses being equal to T/7. Such signal can be produced by the reference circuit ·CD 4022 B from NATIONAL SEMICONDUCTOR, Santa Clara, Calif.

Figure 2B:
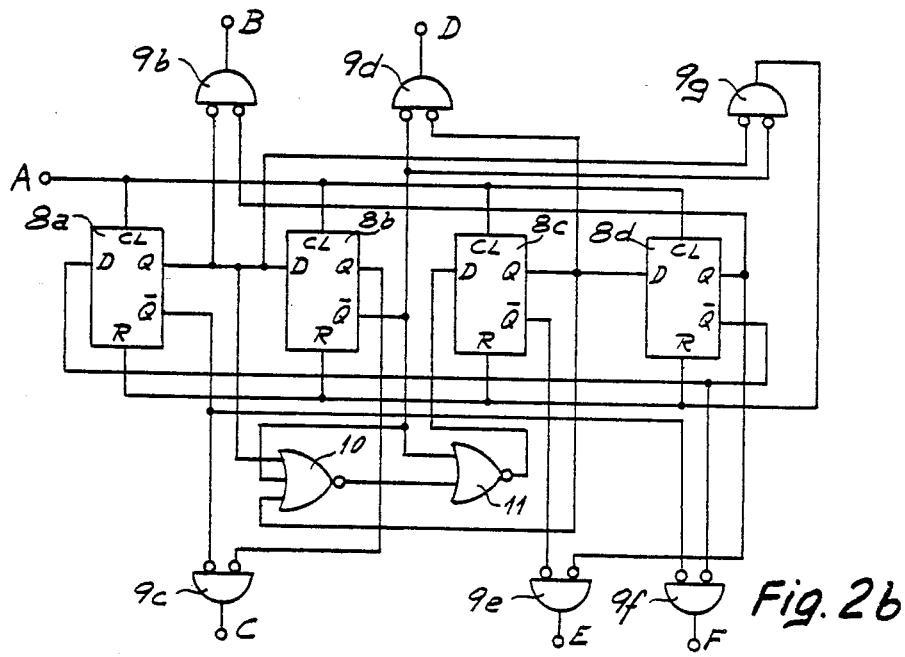
FIG. 2b is the electrical circuit diagram of an embodiment of another circuit of the system shown in FIG. 1, FIGS. 3a to 3f show the diagrams in respect time of signals appearing at the terminals of the circuit shown in FIG. 2a, in positions of temporal correspondence.
Figure 2A:
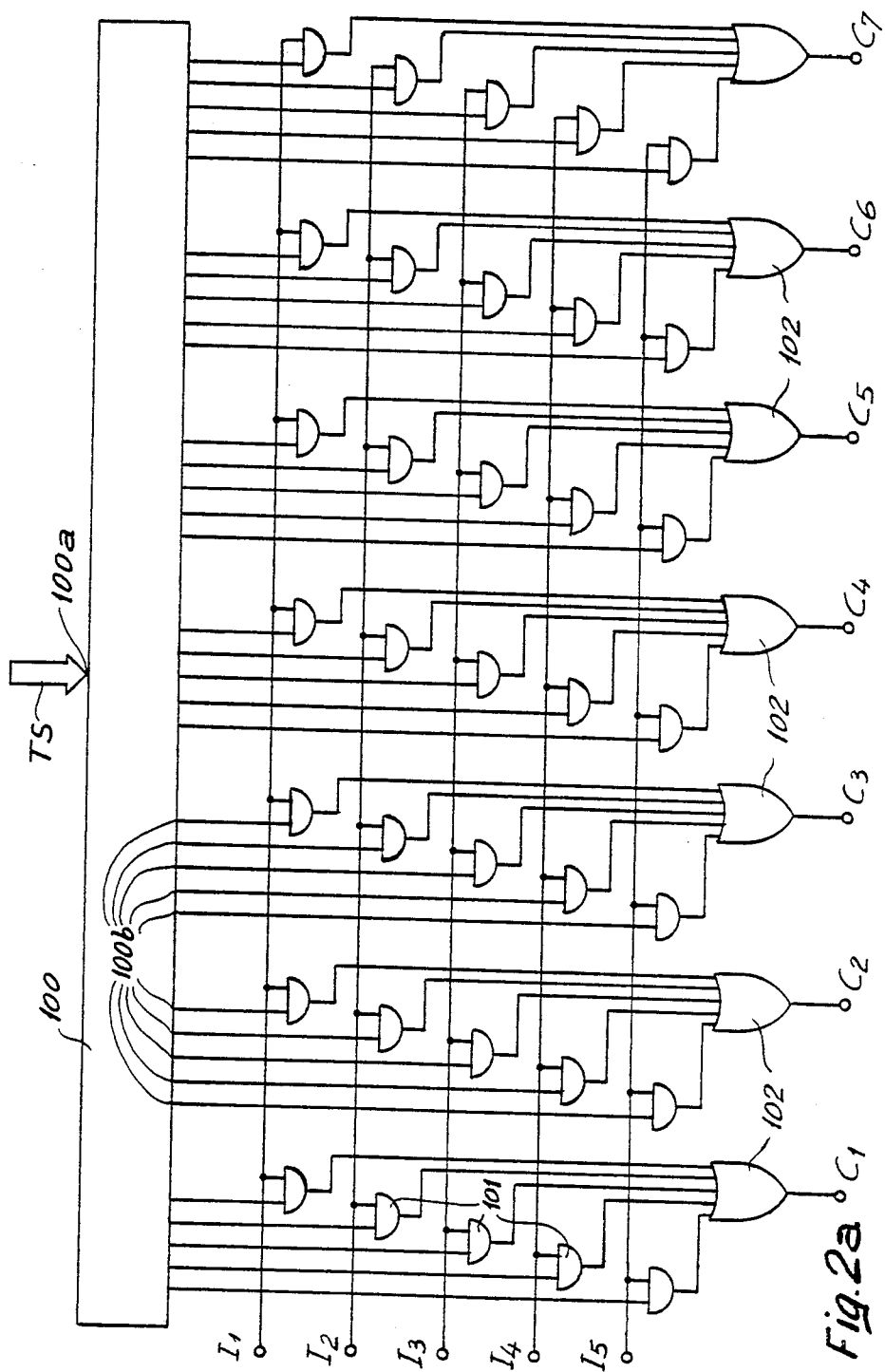
FIG. 2a is the electrical circuit diagram of an embodiment of one of the circuits of the system shown in FIG. 1.

It will be appreciated that the circuits shown in FIGS. 2a and 2b may each be replaced by any other equivalent circuit.

Moveover, instead of using the above-described signals S1 to S7, as reference signals, it would be possible to use other types of signals Sp provided that the effective value V of the potential difference between any two different $S_i$ and $s_j$ is such that:

$$V = \sqrt{(S_i - S_j)^2} \geq V_s$$

in which Vs is a predetermined value equal to the minimum potential difference which has to be applied between an electrode 15 of the first system and an electrode $16_a$ or $16_b$ of the second system to produce an electro-optical effect in the liquid crystal layer 14 at the position at which said electrode 15 and said electrical $16_a$ or $16_b$ intersect.

While there are shown and described several preferred illustrated embodiments of the invention it will be understood by those skilled in the art that other modifications may be made within the principles of the invention and the scope of the appended claims.

What is claimed is:

1. An electro-optical display device comprising:
  (a) a display cell comprising a layer of material which is capable of responding to the application of an electrical field by a modification of its optical behaviour,
  (b) means for applying said electrical field to said layer at each point of a matrix of points arranged in lines and columns comprising a first system of mutually insulated electrodes applied on a first face of said layer for defining said lines of points and a second system of mutually insulated electrodes applied on the second face of said layer for defining said columns of points and arranged in several groups comprising each a first and a second electrode, said first electrode in one of said groups comprising a series of first elementary conducting areas electrically connected to each other and spaced from each other, said second electrode in said one of said groups comprising a series of second elementary conducting areas electrically connected to each other and disposed between said first elementary conducting areas, and at least a portion of one of said first elementary conducting areas and at least a portion of the second elementary conducting area adjacent to said portion of said one of said first elementary conducting area being both disposed in a facing relationship with one and the same electrode of said first system of electrodes, and
  (c) a control device comprising means for producing at least n+1 different electrical signals, n being the number of electrodes of said first system, means for applying each of the first n signal to a respective electrode of said first system and means responsive to a display control signal for applying to each electrode of said second system a respective signal which is selected from said at least n+1 signals in dependence on said control signal.

2. The display device of claim 1, wherein one of said first elementary conducting areas and one of the second elementary conducting areas adjacent to said one of said first elementary conducting areas are both entirely disposed in a facing relationship with only one of said electrodes of said first system of electrodes.

3. The display device of claim 1, wherein one of said elementary conducting areas is disposed in a facing relationship with two adjacent electrodes of said first system of electrodes.

4. The display device of claim 1 wherein said elementary conducting areas of an electrode are electrically connected together by isthmuses.

5. The display device of claim 1 wherein said elementary conduct areas of said first electrode are geometrically aligned with those of said second electrode.

* * * * *